United States Patent [19]

Feix et al.

[11] 4,280,043
[45] Jul. 21, 1981

[54] WELDING TORCH WITH MECHANICAL AND PNEUMATIC CLEANING

[75] Inventors: Jacques Feix, Saint Ouen l'Aumone; Frederic Cardot, Andresy, both of France

[73] Assignee: L'Air Liquide, Scoiete Anonyme pour l'Etude et l'Exploitation des Procedes Georges Claude, Paris, France

[21] Appl. No.: 3,910

[22] Filed: Jan. 15, 1979

[30] Foreign Application Priority Data

Feb. 8, 1978 [FR] France .................. 78 03458

[51] Int. Cl.³ .................. B23K 9/16; B23K 9/26
[52] U.S. Cl. .................. 219/137.31; 219/74; 219/137.43
[58] Field of Search .................. 219/74, 75, 137.31, 219/137.43; 15/406; 134/8

[56] References Cited

U.S. PATENT DOCUMENTS

| 2,833,913 | 5/1958 | Bernard | 219/137.43 X |
| 3,284,608 | 11/1966 | McDonald | 219/137.43 |
| 3,493,717 | 2/1970 | Sciaky | 219/127 |
| 4,011,100 | 3/1977 | Ross | 134/8 |

FOREIGN PATENT DOCUMENTS 1488981 6/1967 France .
1583147 10/1969 France .

Primary Examiner—Gene Z. Rubinson
Assistant Examiner—Keith E. George
Attorney, Agent, or Firm—Lee C. Robinson, Jr.

[57] ABSTRACT

A welding torch having two relatively movable assemblies of elements and an annular chamber therebetween. One of the assemblies is provided with a scraping device to strip strongly adhering metal particles from the lower portion of the inert gas chamber of the torch, and a pneumatic system is operative to then remove these as well as the remaining weakly adhering particles from the entire length of the chamber.

13 Claims, 4 Drawing Figures

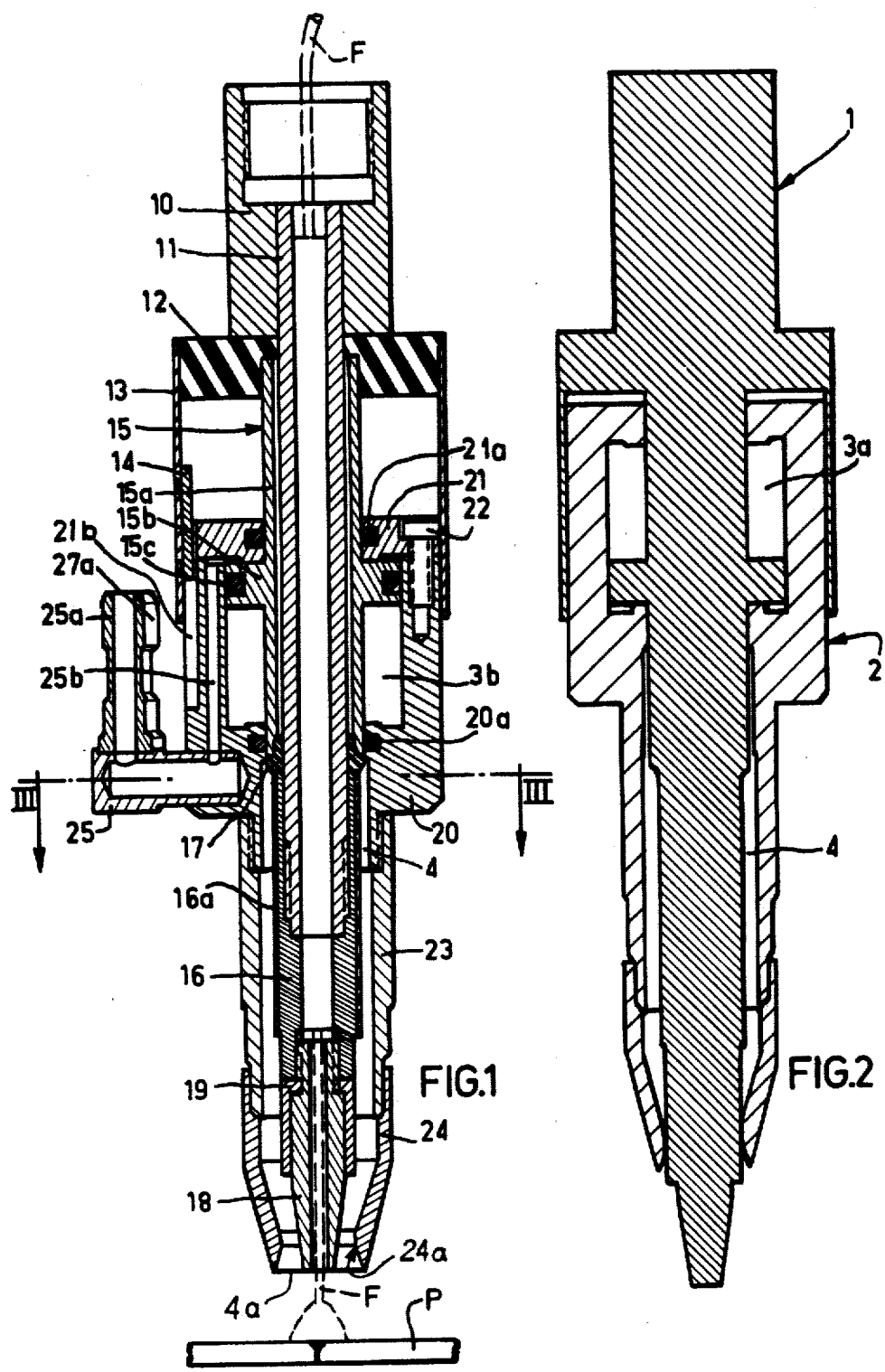

WELDING TORCH WITH MECHANICAL AND PNEUMATIC CLEANING

BACKGROUND OF THE INVENTION

This invention relates to a welding torch and more particularly to an electric arc welding torch having a consumable electrode.

The present invention, while of general application, is particularly well suited for use with welding torches of the type which produce the weld under an inert gaseous atmosphere. It is known that in the welding process practiced with this type of torch, called MIG welding, the transfer of molten metal in the arc usually occurs in the form of fine globules, some of which rise upwardly and are then thrown in the direction of the torch. The globules exhibit a tendency to settle on the lower portion of the torch adjacent the outlet orifice for the inert shielding gas, to form an agglomerate of strongly adhering particles which pose the danger of plugging the outlet orifice and thereby obstructing the passage of the shielding gas. Other globules frequently penetrate into the interior of the torch, that is to say, well into the shielding gas chamber. These latter globules settle on the walls of the chamber in the form of particles which do not adhere so tightly but in time nevertheless interfere with the passage of the shielding gas. Moreover, the particles may establish an electrical path between the components of the torch in contact with the high voltage electrode and those components which normally are insulated from the electrode. The resulting short circuit would seriously impair the welding operation and very likely damage the torch.

Heretofore, attempts to resolve the particle agglomeration problem in some cases utilized a part capable of translatory motion and acting as a scraper adjacent the outlet orifice for the inert gas. However, this system resulted in only a very crude cleaning job in the discharge portion of the torch and was of little value in the removal of particles which penetrated into the interior of the shielding gas chamber.

Other attempts to resolve the problem entailed some form of blower system, for example, a compressed-air blower, in the interior of the shielding gas chamber. To be effective, such a system required a source of compressed gas under relatively high pressure (on the order of 12 bars). Although the system worked reasonably well for lightly adhering particles, it had little or no effect on the strongly adhering agglomerates forming at the nozzle end of the torch.

SUMMARY

One general object of this invention, therefore, is to provide a new and improved welding torch which may be readily cleaned in a rapid and straightforward manner.

More specifically, it is an object of the invention to provide such a torch in which accumulated particles of welding material may be removed from the entire inner wall of the shielding gas chamber.

Another object of the invention is to provide a welding torch of the character indicated which is economical to manufacture and thoroughly reliable in operation.

In accordance with one characteristic of the invention, the torch is provided with a mechanical scraping mechanism which acts at least during part of the cleaning operation on the wall of the shielding gas chamber to mechanically remove the strongly adhering particles from acjacent to the outlet orifice of the chamber. Throughout the cleaning operation of fluid stream is directed into the chamber to sweep the entire volume of the chamber so as to strip the lightly adhering particles and sweep them, along with those which have been mechanically removed, out of the chamber.

Through the combination of mechanical action and fluid action, all of the particles are removed and ejected, regardless of the degree to which they adhere and irrespective of their location in the chamber, thus assuring complete cleaning of the torch.

In accordance with another characteristic of several particularly important embodiments of the invention, the scraping mechanism comprises a mechanical scraper attached to one portion of the torch and a pneumatic jack for displacing that portion relative to the remaining portion. The scraper is designed to make contact, during the course of this relative displacement, with that part of the wall of the chamber which is adjacent to the outlet orifice so as to remove the firmly adhering particles. The pneumatic jack operates automatically to provide a particularly efficient scraping action.

In accordance with a further characteristic of the invention, in several advantageous embodiments, the cleaning gas is introduced into the chamber at the same level as that of the shielding gas. With this arrangement, substantially all of the agglomerated particles are removed irrespective of how far they have penetrated into the interior of the chamber.

In accordance with still another characteristic of the invention, in certain good arrangements, the cleaning gas is discharged tangentially into the chamber to produce turbulence in the incoming gas. Such turbulence greatly enhances its ability to loosen lightly adhering particles within the chamber.

In addition, in accordance with some embodiments of the invention, the inlet duct for the cleaning gas also serves as the duct for the admission of the shielding gas. This arrangement further insures that the entire chamber will be swept.

These and other characteristics and advantages of the invention will become more fully apparent from the following description of a preferred embodiment thereof, when read with reference to the accompanying drawings.

BRIEF DESCRIPTION OF THE DRAWINGS

FIG. 1 is an axial section through a welding torch in accordance with an illustrative embodiment of the invention in its operating position for welding.

FIG. 2 is a schematic representation of the axial section of FIG. 1 in which the two relatively movable assemblies of the torch are shown in outline form, the torch being illustrated in its position during the cleaning operation.

DESCRIPTION OF A PREFERRED EMBODIMENT

Figure 3:
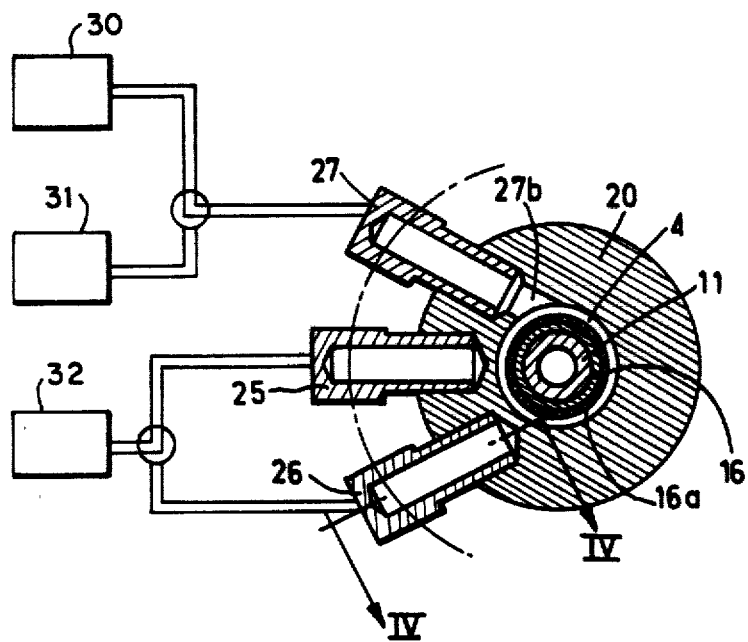
FIG. 3 is a sectional view taken along the line III—III in FIG. 1, together with a schematic representation of suitable gas sources useful with the torch.

According to the embodiment shown in the drawings, the torch in accordance with the invention comprises two assemblies of elements, namely, a longitudinally extending stationary assembly 1, shown diagrammatically in FIG. 2 and formed by the elements 10 to 19 of FIG. 1, and a coaxial movable assembly 2, likewise shown diagrammatically in FIG. 2 and formed by the elements 20 to 27 of FIG. 1. The two assemblies 1 and 2 form a pneumatic jack. The piston portion of the jack, which is part of the stationary assembly 1, is located in the interior of a hollow body included within the movable assembly 2. The piston divides the hollow body into two chambers 3a and 3b to which the actuating fluid is admitted under pressure.

The movable assembly 2 partly surrounds the stationary assembly 1 in the lower portion of the torch, as viewed in FIGS. 1 and 2, to form an annular chamber 4 for the inert shielding gas between the two assemblies. The shielding gas is discharged from the chamber outlet 4a in the form of a shielding gas column which surrounds the consumable electrode F during the welding operation.

The upper portion of the stationary assembly 1 comprises a hollow support 10. The support 10 is fabricated from copper or other electrically conductive material and serves as a portion of the conductive path for feeding electric current to the consumable electrode F.

Mounted on the support 10 is a tubular sleeve 11 made of brass, for example. This sleeve extends coaxially through an annular disk 12 of an electrically insulating material such as that available commercially under the trademark CELORON. The upper end of a protective skirt 13, which may be made of any material, is secured to the outer periphery of the disk 12. The lower portion of the skirt 13 carries a slide plate 14 whose function will be explained hereinafter.

Coaxial with the sleeve 11 and external thereto is a tubular piston 15. The piston 15 illustratively is of aluminum and includes a rod-shaped portion 15a and an integrally formed disk 15b having a circumferential gasket 15c.

Mounted on the lower portion of the tubular sleeve 11 is a second tubular sleeve 16 which likewise may be of brass. The outer periphery of the sleeve 16 is provided with an electrically insulating layer 16a having a thickness which illustratively may be of the order of about five to ten millimeters. A centering ring 17 of insulating material is carried by the upper end of the sleeve 16 to hold the piston 15 against the insulating disk 12. Since the piston 15 is supported between the ring 17 and the disk 12, both of which are made of an insulating material, and since the inside diameter of the rod 15a is considerably larger than the outside diameter of the sleeve 11, the piston is electrically insulated from the sleeve.

A tapered tube 18 is secured by means of screws, for example, to the lower portion of the tubular sleeve 16. The tube 18 is of a highly conductive material such as copper which serves to transmit the welding current to the electrode wire F and at the same time to guide the latter. The inner channel formed by the sleeves 11 and 16 and the tube 18 serves as a passage for the wire F. During the welding operation the wire is driven continuously in translatory motion and emerges at the lower end of the torch to reach the part P being welded.

Supported between the lower portion of the tubular sleeve 16 and the contact tube 18 is a scraper 19. The scraper 19 is fabricated from a very hard copper alloy, for example cuprochromium. As will be more fully explained hereinafter, the scraper serves to remove strongly adhering metal particles from the lower portion of the chamber 4.

The movable assembly 2 comprises a hollow metallic body 20. The upper portion of the body 20 is closed by an annular cover 21, also made of metal, which is attached to the body by screws 22. The body 20 and its cover 21 are movable relative to the piston 15, and the disk 15b of the latter is lodged within the body to divide its internal volume into the two chambers 3a and 3b. Gaskets 20a and 21a are provided on the body 20 and the cover 21, respectively. These gaskets surround the piston rod 15a above and below the disk 15b, while the gasket 15c around the disk is in contact with the inside wall of the body 20. The cover 21 is provided with a guide groove 21b which cooperates with the slide plate 14 to prevent rotation of the movable assembly relative to the stationary assembly.

Bolted to the lower portion of the hollow body 20 is a tubular support 23 of brass or similar material. The lower portion of the support 23 in turn is bolted to a nozzle 24. The nozzle surrounds the tapered tube 18 in spaced relationship therewith to form the discharge portion of the annular chamber 4.

Figure 4:
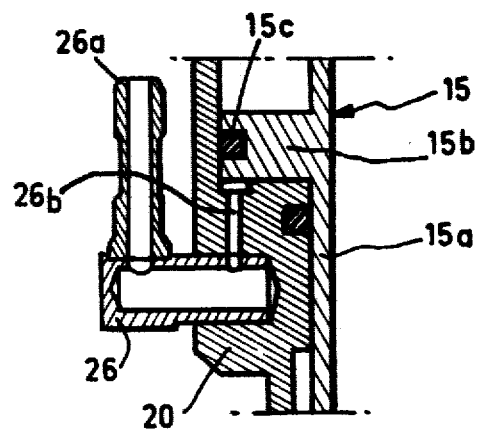
FIG. 4 is a fragmentary sectional view taken along the line IV—IV in FIG. 3.

As best seen in FIG. 3, three nipples 25, 26 and 27 are mounted on the hollow body 20 in equidistant relationship with each other. The nipples 25 and 26 are supplied with compressed gas for actuating the pneumatic jack, while the nipple 27 is used for the admission of both the cleaning or scavenging gas and the shielding gas into the annular chamber 4 from a cleaning gas source 30 and a shielding gas source 31, respectively. The nipples 25 and 26 are provided with couplings 25a and 26a (FIGS. 1 and 4), respectively, and the nipples communicate through ducts 25b and 26b in the body 20 with the chambers 3a and 3b. The actuating gas for the jack may be compressed air, for example, supplied from a suitable source 32. The nipple 27 includes a coupling 27a and communicates through a duct 27b with the chamber 4. The duct 27b discharges in the upper portion of the chamber and substantially tangentially to its walls.

The cleaning gas is introduced into the chamber 4 through the duct 27b and illustratively may be compressed air, delivered at a pressure of about 6 bars. As the gas enters the chamber, it produces, by reason of the tangential orientation of the duct 27b, a turbulent vortical pattern which greatly enhances its effectiveness in sweeping away the lightly adhering particles sticking to the walls of the chamber.

The introduction of the cleaning gas and the shielding gas into the upper portion of the chamber 4 through the same nipple 27 insures that the chamber is cleaned over the entire length traversed by the shielding gas. It also simplifies the construction of the torch by doing away with the need for providing check valves and other ancillary components which would be required if two separate inlets were provided.

Moreover, the introduction of the two gases through the same nipple helps to eliminate traces of air within the chamber 4 at the start of the ensuing welding operation. To accomplish this a small amount of shielding gas is fed into the chamber 4 prior to the welding operation to purge the chamber of any residual scavenging air.

The cleaning of the torch after a welding operation is effected as follows:

With the feed of shielding gas interrupted, compressed scavenging air is fed to the nipple 27. The air loosens and sweeps away the lightly adhering particles located on the walls of chamber 4. After a predetermined interval, illustratively about one second, the pneumatic jack is supplied with compressed air through the nipple 25, thereby causing the movable element 2 to retract, that is to say, to move upwardly relative to the stationary element 1 to the position shown in FIG. 2. During such retraction the inside wall 24a of the nozzle 24 rubs against the scraper 19 to strip away the agglomerate of firmly adhering particles formed within the lower portion of the chamber 4.

Compressed air is then fed to the jack through the nipple 26 (FIG. 4) to return the movable element 2 to the lower position. The scavenging air continues to be introduced through the nipple 27 and sweeps away the particles detached by the scraper 19. About one second after the movable element has returned, the supply of scavenging air is shut off.

It should be noted that the tangential introduction of the scavenging gas into the chamber 4 permits the gap between the movable element 2 and the stationary element 1 to be substantially reduced. The chamber 4 has a small cross-sectional area to lower the bulk of the torch as well as the pressure of the scavenging gas needed to provide effective cleaning. Despite the reduced section of the chamber 4, the insulating layer 16a on the sleeve 16 helps to avoid short circuits between the stationary assembly 1 and the movable assembly 2 which might otherwise result from the metal particles within the chamber.

Because it is easily cleaned, the torch in accordance with the invention may be readily used in any position, and particularly in overhead welding processes, which were difficult with previous torches because of the rapid penetration of particles into the shielding gas chamber.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. An electric welding torch having a chamber exposed to particles of material from the weld, the torch comprising, in combination:
    a first assembly including a welding electrode protruding from one end thereof;
    a second assembly in spaced relationship with the first assembly to define said chamber, a portion of said second assembly being located adjacent said one end and forming with said first assembly an outlet orifice for said chamber;
    scraper means carried by one of said assemblies in position to engage the other assembly adjacent said outlet orifice for detaching firmly adhering particles from said chamber, said other assembly defining an enclosed cylinder disposed about said one assembly;
    operating means for moving said scraper means into engagement with said other assembly to thereby detach said firmly adhering particles, said operating means including a piston enclosed in said other assembly and slidably disposed in said cylinder for controlling the movement of said scraper means; and
    means for directing a cleaning fluid through the entire volume of said chamber at a pressure sufficient to detach lightly adhering particles therefrom and sweep both the lightly adhering particles and the firmly adhering particles detached by the scraper means through said outlet orifice, the cleaning fluid being directed through said chamber subsequent to the formation of said weld.

2. An electric welding torch as defined in claim 1, in which the operating means comprises a pneumatic jack for moving the scraper means into engagement with said other assembly.

3. An electric welding torch having a shielding gas chamber exposed to particles of material from the weld, the torch comprising, in combination:
    a first assembly including a welding electrode protruding from one end thereof;
    a second assembly in spaced relationship with the first assembly to define said chamber, a portion of said second assembly being located adjacent said one end and forming with said first assembly an outlet orifice for said chamber;
    scraper means carried by one of said assemblies in position to engage the other assembly adjacent said outlet orifice for detaching firmly adhering particles from said chamber;
    operating means for moving said scraper means into engagement with said other assembly to thereby detach said firmly adhering particles;
    supply means including a source of shielding gas and a source of cleaning fluid; and
    means communicating with said supply means for selectively directing shielding gas and cleaning fluid through the entire volume of said shielding gas chamber, the cleaning fluid passing through the shielding gas chamber being maintained at a pressure sufficient to detach lightly adhering particles therefrom and sweep both the lightly adhering particles and the firmly adhering particles detached by the scraper means through said outlet orifice, the cleaning fluid being directed through said shielding gas chamber subsequent to the formation of said weld.

4. An electric welding torch having a shielding gas chamber exposed to particles of material from the weld, the torch comprising, in combination:
    a first assembly including a welding electrode protruding from one end thereof;
    a second assembly in spaced relationship with the first assembly to define said chamber, said second assembly being movable relative to said first assembly, and a portion of said second assembly being located adjacent said one end and forming with said first assembly an outlet orifice for said chamber;
    scraper means carried by one of said assemblies in position to engage the other assembly adjacent said outlet orifice for detaching firmly adhering particles from said chamber;
    operating means for moving said one assembly relative to said other assembly to actuate said scraper means and thereby detach said firmly adhering particles;
    supply means including a source of shielding gas and a source of cleaning fluid;
    means communicating with said supply means for selectively directing shielding gas and cleaning fluid through said shielding gas chamber, the cleaning fluid passing through the shielding gas chamber being maintained at a pressure sufficient to detach lightly adhering particles therefrom and sweep both the lightly adhering particles and the firmly adhering particles detached by the scraper means through said outlet orifice; and means connected to the shielding gas and cleaning fluid introducing means for controlling the sequential introduction of shielding gas and cleaning fluid into said chamber.

5. An electric welding torch as defined in claim 4, which further comprises, in combination:

means defining an inlet duct communicating with said chamber, said shielding gas and said cleaning fluid being introduced through said inlet duct and traversing the same path through said chamber.

6. An electric welding torch as defined in claim 4, in which the cleaning fluid comprises air.

7. An electric welding torch having a shielding gas chamber exposed to particles of material from the weld, the torch comprising, in combination:

a first longitudinally extending assembly including a welding electrode protruding from one end thereof;

a second assembly coaxial with the first assembly and in spaced relationship therewith to define said chamber, said second assembly being longitudinally movable relative to said first assembly and defining an enclosed assembly separate from said chamber, and a portion of said second assembly being located adjacent said one end and forming with said first assembly an outlet orifice for said chamber;

scraper means carried by one of said assemblies in position to engage the other assembly adjacent said outlet orifice for detaching firmly adhering particles from said chamber;

operating means for moving said one assembly relative to said other assembly to actuate said scraper means and thereby detach said firmly adhering particles, said operating means including a piston enclosed in said second assembly and slidably disposed in said cylinder for controlling the movement of said scraper means;

supply means including a source of shielding gas and a source of cleaning gas;

means cooperating with the supply means for selectively and sequentially directing shielding gas and cleaning gas through the entire volume of said shielding gas chamber, the cleaning gas passing through the shielding gas chamber being maintained at a pressure sufficient to detach lightly adhering particles therefrom and sweep both the lightly adhering particles and the firmly adhering particles detached by the scraper means through said orifice; and means connected to the shielding gas and cleaning fluid introducing means for controlling the selective and sequential introduction of shielding gas and cleaning gas into said chamber.

8. An electric welding torch as defined in claim 7, in which the shielding gas chamber is of annular cross-section, the cleaning gas being tangentially directed into said chamber to create turbulence therein.

9. An electric welding torch having a shielding gas chamber exposed to particles of material from the weld, the torch comprising, in combination:

a first longitudinally extending assembly including a welding electrode protruding from one end thereof;

a second assembly coaxial with the first assembly and in spaced relationship therewith to define said chamber, said second assembly being longitudinally movable relative to said first assembly and defining therewith a fluid cylinder disposed about said first assembly and spaced from said chamber, a portion of said second assembly being located adjacent said one end and forming with said first assembly an outlet orifice for said chamber;

means for introducing inert shielding gas into said chamber during the formation of the weld;

scraper means carried by one of said assemblies in position to engage the other assembly adjacent said outlet orifice for detaching firmly adhering particles from said chamber;

operating means for moving said one assembly relative to said other assembly to actuate said scraper means and thereby detach said firmly adhering particles, said operating means including a piston enclosed in said second assembly and slidably disposed within said fluid cylinder and means for applying pressure to said piston; and means for directing a cleaning gas through the entire volume of said shielding gas chamber at a pressure sufficient to detach lightly adhering particles therefrom and sweep both the lightly adhering particles and the firmly adhering particles detached by the scraper means through said outlet orifice, the cleaning gas being directed through said shielding gas chamber subsequent to the formation of said weld.

10. An electric welding torch having a shielding gas chamber exposed to particles of material from the weld, the torch comprising, in combination:

a first longitudinally extending assembly including a consumable electrode protruding from one end thereof;

a second assembly disposed around a part of the first assembly in spaced relationship therewith to define said chamber, said second assembly being longitudinally movable relative to said first assembly, and a portion of said second assembly being located adjacent said one end and forming with said first assembly an outlet orifice for said chamber;

means including a fluid inlet duct for introducing inert shielding gas into said chamber during the formation of the weld;

scraper means carried by one of said assemblies in position to engage the other assembly adjacent said outlet orifice for detaching firmly adhering particles from said chamber;

operating means for moving said one assembly relative to said other assembly to actuate said scraper means and thereby detach said firmly adhering particles;

supply means including a source of shielding gas and a source of cleaning gas; and means communicating with said supply means for selectively directing shielding gas and cleaning gas through said fluid inlet duct into and through the entire volume of said shielding gas chamber, the cleaning gas being maintained at a pressure sufficient to detach lightly adhering particles therefrom and sweep both the lightly adhering particles and the firmly adhering particles detached by the scraper means through said outlet orifice, the cleaning gas being directed through said shielding gas chamber subsequent to the formation of said weld.

11. An electric welding torch as defined in claim 10, which further comprises, in combination:
   a layer of electrical insulating material disposed on a portion of said first assembly in facing relationship with said second assembly.

12. An electric welding torch having an annular shielding gas chamber exposed to particles of material from the weld, the torch comprising, in combination:
   a first generally cylindrical assembly including a welding electrode protruding from one end thereof;
   a second generally cylindrical assembly coaxial with the first assembly and in spaced relationship therewith to define said annular chamber, said second assembly being longitudinally movable relative to said first assembly and defining therewith a fluid cylinder spaced from said chamber, a portion of said second assembly being located adjacent said one end and forming with said first assembly an outlet orifice for said chamber;
   means for introducing inert shielding gas into said chamber during the formation of the weld;
   scraper means carried by said first assembly in position to engage said second assembly adjacent said outlet orifice for detaching firmly adhering particles from said chamber;
   operating means for moving said second assembly relative to said first assembly to actuate said scraper means and thereby detach said firmly adhering particles, said operating means including a piston within said fluid cylinder and means for applying pneumatic pressure to said piston;
   supply means including a source of shielding gas and a source of cleaning gas; and
   means communicating with said supply means for selectively directing shielding gas and cleaning gas into said shielding gas chamber, the cleaning gas passing through the entire volume of the chamber at a pressure sufficient to detach lightly adhering particles therefrom and sweep both the lightly adhering particles and the firmly adhering particles detached by the scraper means through said outlet orifice, the cleaning gas being directed through said shielding gas chamber subsequent to the formation of said weld.

13. An electric welding torch as defined in claim 12, which further comprises, in combination:
   means defining an inlet duct communicating with said chamber, said shielding gas and said cleaning gas being introduced through said inlet duct and traversing the same path through said chamber and being discharged from said outlet orifice.

* * * * *